W. A. SCHMEYKAL.
FAUCET.
APPLICATION FILED MAR. 26, 1913.
1,174,617.
Patented Mar. 7, 1916.
2 SHEETS—SHEET 2.
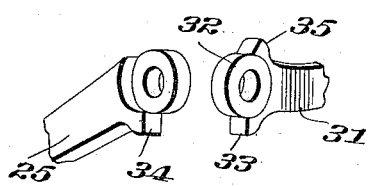
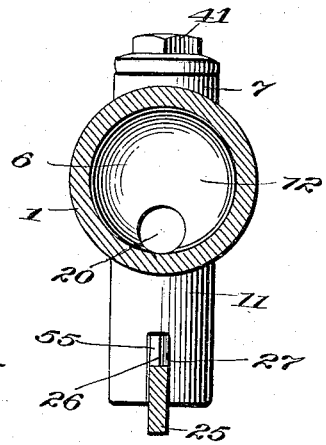
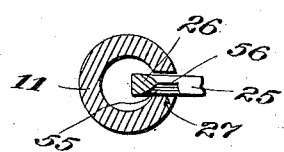
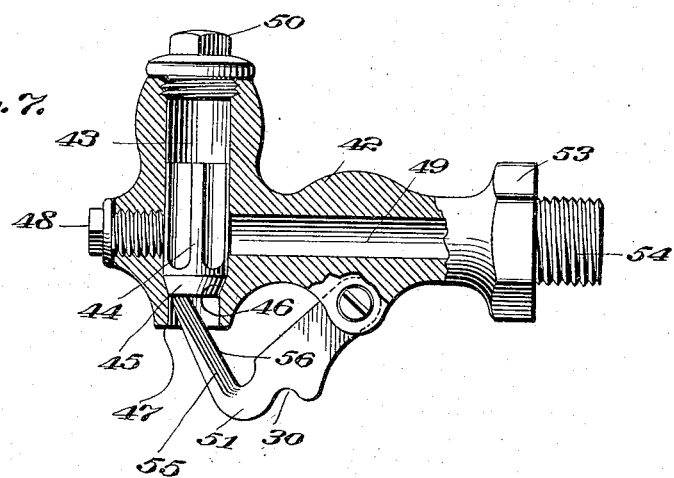

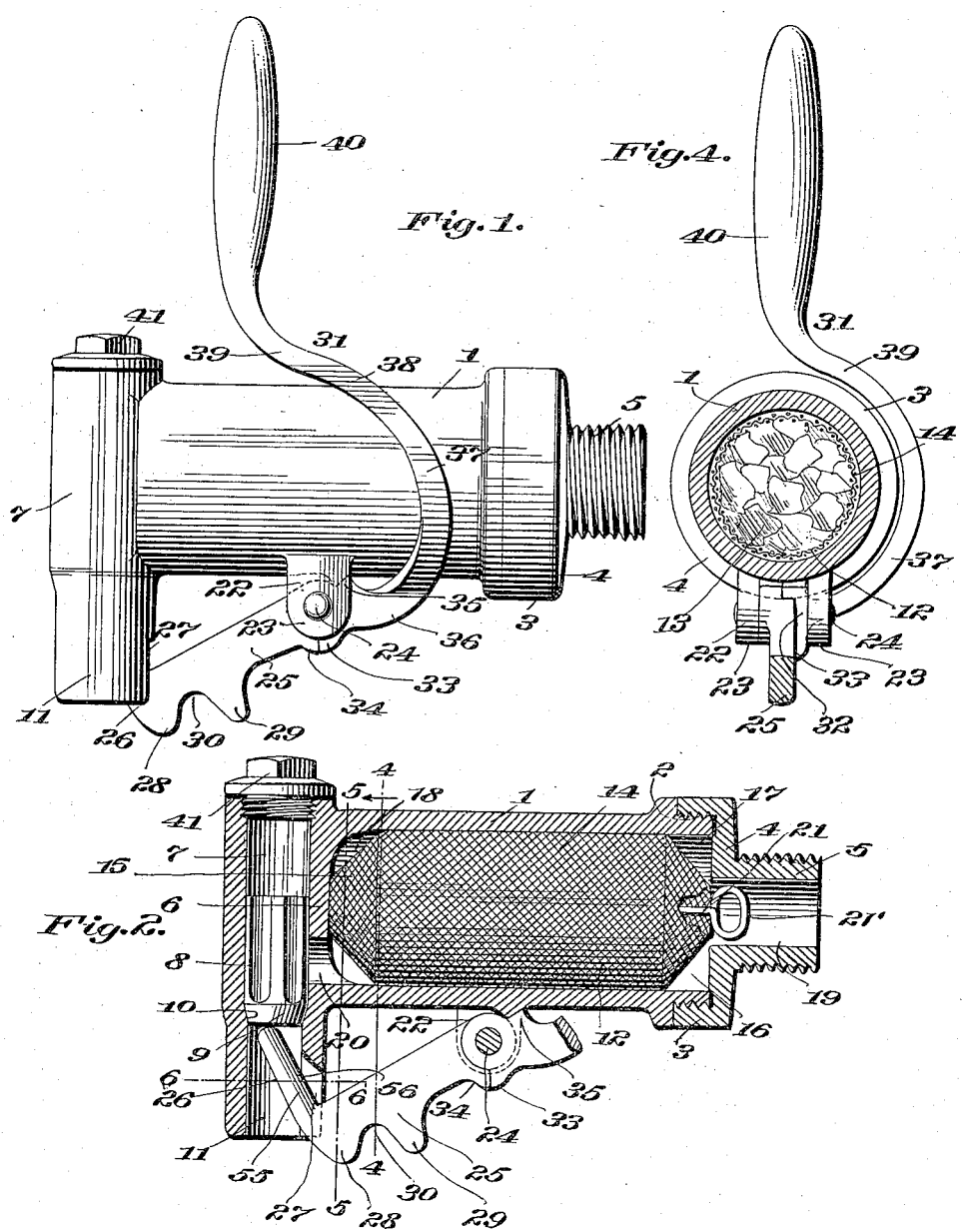

UNITED STATES PATENT OFFICE.

WALTER A. SCHMEYKAL, OF GOSHEN, INDIANA.

FAUCET.

1,174,617.     Specification of Letters Patent.     Patented Mar. 7, 1916.

Application filed March 26, 1913. Serial No. 756,932.

*To all whom it may concern:*

Be it known that I, WALTER A. SCHMEY-KAL, a citizen of the United States, residing at Goshen, in the county of Elkhart and State of Indiana, have invented new and useful Improvements in Faucets, of which the following is a specification.

This invention relates to faucets, and particularly to one which may be automatically operated through direct contact of the article or vessel with the valve lifting element; and it has for its object the provision of a structure of this character which will include a lifting bar and a controlling lever, the latter being so constructed that it will act gravitationally when adjusted to one position to maintain an opened adjustment of the valve.

Another object of the invention is the provision of a faucet structure wherein the valve lifting bar or element may be actuated without effecting adjustments of the lever.

Another object of the invention is the provision of a lifting bar which may be inserted in the nozzle of the valve casing and which will be constructed whereby to prevent the lateral scattering of the liquid on its discharge to the receiving receptacle.

A further object of the invention is the provision of a filtering member which is arranged in the valve casing whereby to be disposed in the direct path of discharge of the liquid so as to filter the same before its discharge from the nozzle.

Another object of the invention is the provision of a valve structure wherein the filtering element thereof may be adjusted into or removed from the casing with facility.

Another object of the invention is the provision of a valve structure wherein the various parts thereof can be conveniently separated and thereby maintained in a highly sanitary condition.

With these and other objects in view, the invention consists of certain novel features of construction, combination and arrangement of parts, as will be hereinafter described and claimed.

In the accompanying drawings: Figure 1 is a side view of the faucet; Fig. 2 is a longitudinal section therethrough; Fig. 3 is a perspective view of a portion of the lifting bar and the controlling lever; Fig. 4 is a section on line 4—4 of Fig. 2; Fig. 5 is a section on line 5—5 of Fig. 2, looking in the direction of the arrow; Fig. 6 is a section on line 6—6 of Fig. 2; and Fig. 7 is a view similar to Fig. 2, showing a slightly modified form of the invention.

In the form of the invention illustrated in Figs. 1 to 6 inclusive, the faucet structure is shown to embody a horizontally-disposed casing 1 having an exterior thread 2 at one end which accommodates the correspondingly threaded flange 3 of a cap 4, said cap having a threaded extension 5 which may be connected in any suitable source of liquid supply (not shown). The opposite end of the casing 1 is closed by a crown 6 and as illustrated said crown is provided with an integral vertically disposed valve chamber 7, in which is mounted a gravitationally closing valve 8, the lower end of which being provided with a reduced or beveled effective seating portion 9 which is adapted to engage against a correspondingly formed seat 10 in the inner walls of the valve chamber. The walls of the valve chamber are extended for a considerable distance below the valve seat portion 10, so as to provide a discharge nozzle 11 which is adapted to receive the liquid and to concentrate the same in its discharge to the receiving receptacle (not shown).

The liquid distributing and filtering chamber 12 of the casing 1 has removably mounted therein a filtering medium 13 which is shown to include a foraminous casing 14 having substantially conical ends 15 and 16. The filtering medium is preferably co-extensive with the chamber 12, so that the small ends of the conical portions 15 and 16 aline with the adjacent ends of the casing 1 to permit the walls of the conical portion to define with the adjacent walls of the casing intake and discharge passages 17 and 18 respectively. The intake passages 17 open directly into the bore 19 of the cap 4 whereby the liquid may be properly introduced into the chamber 1 and subjected to the action of the filtering medium. The crown 6 is provided at its lower end with a horizontally disposed discharge passage 20 which opens directly into the valve chamber 7 so that the liquid may flow into the nozzle 6 when the valve 8 is lifted above said opening. A rod 21 is fixedly secured to the filtering structure, being extended through the conical end 16 and provided therebeyond with a manipulating head 21′ whereby the filtering device may be conveniently removed from the chamber 12 when the casing 1 is separated from the head 4.

A bracket 22 is fixedly secured to the underside of the casing 1, and connected in the ears 23 of said bracket is a pin 24 on which one end of a lifting bar 25 is mounted for pivotal movements. The bar extends downwardly in the direction of the nozzle 11, and it is terminally provided with an actuating end or finger 26 which extends into the nozzle and which bears beneath the portion 9 of the valve 8. A slot 27 is formed in the nozzle 11, so as to accommodate the lifting bar for vertical tilting movements. The lifting bar is provided with relatively large weight forming portions 28 and 29 which are spaced relatively so as to define an intervening recess 30 which is adapted to accommodate the edge of the receptacle. A manually controlled lever 31 is provided with a portion 32, which is pivotally connected upon the pin 24 and provided with a lug 33 which is adapted to engage against a similar lug 34 on the lifting bar 25. The portion 32 is provided with a stop lug 35 which is adapted to engage against the bracket 22 whereby the adjustment of the lever will be limited in one direction. From the portion 32 the lever extends rearwardly at 36 and then upwardly at 37 against one side of the casing 1 and then forwardly at 38 and then laterally at 39 where it terminates immediately above the longitudinal center of the casing 1. The lateral portion 39 is provided with a relatively heavy controlling handle 40. When it is desired to conduct the liquid in the faucet into large receiving vessels the handle 40 is moved rearwardly, so that the lug 33 will engage against the lug 34 for the purpose of tilting the lifting bar 25 and for effecting an opened adjustment of the valve 8. When the lever 31 is fully tilted, the weighted handle 40 will be disposed below the center of gravity and as a consequence the lifting bar 25 will be effectually suspended in an elevated position. The chamber 7 is provided with a plug 41 which may be removed when it is desired to withdraw the valve 8 or to clean the bore of the chamber.

In the form of the invention shown in Fig. 7 the faucet casing 42 is provided at one end with a vertical valve chamber 43, in which is mounted a gravitationally closing valve 44. This valve is provided with a beveled end 45 which is adapted to seat upon the seat portion 46 on the inner wall of the nozzle 47. The chamber 43 has one of its walls provided with a removable clean-out plug 48, which is alined with the distributing chamber 49 in the casing 42. The upper end of the chamber 43 is closed by a removable plug 50. The lifting bar 51 substantially resembles the one described in the preferred embodiment of the invention, and it is believed that a description of one will suffice for the other. It is of course understood that in either form of the invention, vessels such as cups, glasses or the like may be inserted into the receiving recess 30 of the lifting bar and pressure may be applied against the vessel, so as to effect operative tilting movements of the lifting bar, so as to properly open the valve. The casing 42 terminates in a wrench-engaging head 53 and an attaching nipple 54, which may be of any suitable well known construction.

The effective valve lifting end of each of the lifting bars or elements 25 and 51 is provided with tapered or beveled surfaces 55 defining at their points of intersection with each other relatively sharp longitudinally extending edges 56 which underlie the valve and which are adapted to act against the liquid in its course of discharge and disintegrate the same and thereby tend to concentrate the liquid to its point of common discharge and prevent the lateral scattering of the liquid.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

1. A faucet having a distributing chamber and a valve chamber, the valve chamber opening directly into the distributing chamber and having an outlet, a gravitationally closing valve mounted in the valve chamber and adapted to obstruct the outlet, a nozzle carried by the valve chamber and disposed below said outlet, and a valve lifting bar movably connected with the distributing chamber and having its effective lifting end traversing the nozzle and extending thereinto and bearing against the bottom of the valve and provided with angularly disposed surfaces terminating in a relatively sharp longitudinally extending edge, said lifting bar having an angularly-disposed branch underlying the distributing chamber and extending in the direction of the discharge end of the nozzle and provided with relatively spaced weight portions forming an intervening receptacle receiving space therebetween.

2. A faucet having a distributing chamber and a valve chamber, the valve chamber opening directly into the distributing chamber and having an outlet, a gravitationally closing valve mounted in the valve chamber and adapted to obstruct the outlet, a nozzle carried by the valve chamber and disposed below said outlet, and a valve lifting bar movably connected with the distributing chamber and having its effective lifting end traversing the nozzle and extending thereinto and bearing against the bottom of the valve and provided with angularly disposed surfaces terminating in a relatively sharp longitudinally extending edge, said lifting bar having an angularly-disposed branch underlying the distributing chamber and extending in the direction of the discharge end of the nozzle and provided with relatively spaced weight portions forming an intervening receptacle receiving space therebetween, the nozzle having a vertical slot therein slidably receiving the effective lifting end of said lifting bar.

3. A faucet having a distributing chamber and a valve chamber, the valve chamber opening directly into the distributing chamber and having an outlet, a gravitationally closing valve mounted in the valve chamber and adapted to obstruct the outlet, a nozzle carried by the valve chamber and disposed below said outlet, and a valve lifting bar movably connected with the distributing chamber and having its effective lifting end traversing the nozzle and extending thereinto and bearing against the bottom of the valve and provided with angularly disposed surfaces terminating in a relatively sharp longitudinally extending edge, and a lifting handle operatively connected with the lifting bar and maintaining a valve closing position of the lifting bar when adjusted to one position and maintaining a valve opening position of the lifting bar when adjusted to another position and including a weight terminal actuating portion normally overlying the distributing chamber.

4. A faucet having a distributing chamber and a valve chamber, the valve chamber opening directly into the distributing chamber and having an outlet, a gravitationally closing valve mounted in the valve chamber and adapted to obstruct the outlet, a nozzle carried by the valve chamber and disposed below said outlet, and a valve lifting bar movably connected with the distributing chamber and having its effective lifting end traversing the nozzle and extending thereinto and bearing against the bottom of the valve and provided with angularly disposed surfaces terminating in a relatively sharp longitudinally extending edge, and a lifting handle operatively connected with the lifting bar and maintaining a valve closing position of the lifting bar when adjusted to one position and maintaining a valve opening position of the lifting bar when adjusted to another position and including a weight terminal actuating portion normally overlying the distributing chamber at a point in advance of the point of connection of the lever with the lifting bar.

In testimony whereof I affix my signature in presence of two witnesses.

WALTER A. SCHMEYKAL.

Witnesses:
 NELLIE BALYEAT,
 BESSIE REEVES.